US008509988B2

(12) United States Patent
Uyeki et al.

(10) Patent No.: US 8,509,988 B2
(45) Date of Patent: Aug. 13, 2013

(54) CELLULAR COMMUNICATION STRATEGY

(75) Inventors: Robert Uyeki, Torrance, CA (US); David Michael Kirsch, Torrance, CA (US)

(73) Assignee: Honda Motor Co., Ltd., Tokyo (JP)

(*) Notice: Subject to any disclaimer, the term of this patent is extended or adjusted under 35 U.S.C. 154(b) by 361 days.

(21) Appl. No.: 12/947,723

(22) Filed: Nov. 16, 2010

(65) Prior Publication Data

US 2012/0123633 A1    May 17, 2012

(51) Int. Cl.
G06F 19/00    (2011.01)

(52) U.S. Cl.
USPC .............................. 701/33.4; 701/22; 701/31.5

(58) Field of Classification Search
None
See application file for complete search history.

(56) References Cited

U.S. PATENT DOCUMENTS

| | | | |
|---|---|---|---|
| 5,563,491 A | 10/1996 | Tseng | |
| 5,596,261 A | 1/1997 | Suyama et al. | |
| 5,739,674 A | 4/1998 | Kawahara et al. | |
| 7,698,078 B2 | 4/2010 | Kelty et al. | |
| 2009/0287578 A1 | 11/2009 | Paluszek et al. | |
| 2010/0134067 A1 | 6/2010 | Baxter et al. | |
| 2010/0211643 A1 | 8/2010 | Lowenthal et al. | |
| 2010/0268401 A1* | 10/2010 | Blakemore et al. | 701/2 |
| 2010/0268411 A1 | 10/2010 | Taguchi | |
| 2011/0082621 A1* | 4/2011 | Berkobin et al. | 701/33 |

OTHER PUBLICATIONS

Abuelsamid, S., "GM and OnStar Launch Sophisticated Mobile App for Volt [w/videos]," Jan. 5, 2010, five pages. [Online] [Retrieved on May 19, 2010] Retrieved from the Internet <URL:http://www.autoblog.com/2010/01/05/gm-and-onstar-launch-sophisticated-mobile-app-for-volt/.>.
Cole, J., "Nissan Leaf, Now With iPhone Integration," May 20, 2010, two pages. [Online] [Retrieved May 24, 2010] Retrieved from the Internet <URL:http://nissan-leaf.net/2010/05/20/nissan-leaf-now-with-iphone-integration/.>.
Electric Vehicle News, "BMW Launch ActiveE All Electric 1 Series Coupe," Dec. 16, 2009, ten pages. [Online] [Retrieval Date Unknown] Retrieved from the Internet <URL:http://electric-vehicles-cars-bikes.blogspot.com/2009/12/bmw-launch-activee-electric-1-series.html.>.
PCT International Search Report and Written Opinion, PCT Application No. PCT/US2011/055413, Feb. 1, 2012, ten pages.

* cited by examiner

Primary Examiner — Michael J Zanelli
(74) Attorney, Agent, or Firm — Fenwick & West LLP; Mark Duell (57) ABSTRACT

A mobile device stores charge status information of an electric vehicle. The charge status information is received by the mobile device from the electric vehicle via a short range wireless communication protocol in response to a triggering event at the vehicle indicating that the vehicle has been stopped. The mobile device at a later point receives a request from a user, the request involving a current state of charge of the electric vehicle. The mobile device attempts to communicate with electric vehicle to obtain information from the vehicle for responding to the request. If the mobile device is not able to communicate with the vehicle, the mobile device respond's to the user's request using the stored charge status information.

29 Claims, 4 Drawing Sheets

CELLULAR COMMUNICATION STRATEGY

FIELD OF THE EMBODIMENTS

The embodiments generally relate to electric vehicles and more particularly to remotely determining an electric vehicle's state of charge when unable to communicate with the vehicle.

BACKGROUND

Electric vehicles are vehicles that use one or more electric engines for propulsion of the vehicle. The electric engines are powered by rechargeable batteries on-board the vehicle. Because electric vehicles are powered by on-board batteries, their driving range is limited by the amount of charge in their batteries. When a vehicle's batteries get low on charge, the vehicle can be recharged at a charging station. However, currently there is a limited number of charging stations for electric vehicles. Therefore, it is important for the driver to know the electric vehicle's current state of charge at all times even when the driver is away from the vehicle.

Being able to remotely access an electric vehicle's current state of charge is beneficial in that if the driver decides to travel to a destination, the driver remotely accesses the vehicle's state of charge and based on the accessed information determines whether the destination can be reached. If the vehicle does not have sufficient charge to reach the destination, the driver can alter his plans, for example, by allowing the vehicle to continue charging if it is connected to a charging station or by selecting a new destination that is within the vehicle's range.

Current systems allow a driver to remotely obtain an electric vehicle's current state of charge via a mobile device, such as a cell phone. The mobile device communicates with the vehicle to obtain the vehicle's state of charge. A problem with theses current systems is that if the mobile device is not able to communicate with the electric vehicle, the mobile device has no way of being able to determine the vehicle's current state of charge. A reason that the mobile device may not be able to communicate with the electric vehicle is because the vehicle is parked in a location where it is not able to access a wireless communication network. For example, the vehicle may be parked in an underground garage where there is no cell phone reception.

Thus, there is a need for a way to be able to remotely determine an electric vehicle's state of charge even when it is not possible to communicate with the electric vehicle.

SUMMARY

The embodiments provide a computer based method, a computer program product, and a mobile computer system for remotely responding to a request for information regarding an electric vehicle. In some embodiments, the present disclosure comprises a mobile device storing charge status information of an electric vehicle. The charge status information is received by the mobile device from the electric vehicle via a short range wireless communication protocol (e.g., Bluetooth®) in response to a triggering event at the vehicle indicating that the vehicle has been stopped. The mobile device at a later point receives a request from a user, the request involving a current state of charge of the electric vehicle. The mobile device attempts to communicate with electric vehicle to obtain information from the vehicle for responding to the request (e.g., vehicle's current state of charge). If the mobile device is not able to communicate with the vehicle, the mobile device respond's to the user's request using the stored charge status information.

In other embodiments, the present disclosure comprises a mobile device receiving charge status information of an electric vehicle from the electric vehicle via a short range wireless communication protocol in response to a triggering event at the vehicle indicating that the vehicle has been stopped. The mobile device transmits the charge status information to a remote server for storage. When the mobile device receives a request from a user involving a current state of charge of the electric vehicle, the mobile device forwards the request to the remote server. The remote server attempts to communicate with the electric vehicle to obtain information for responding to the request. If the remote server is not able to communicate with the electric vehicle, the remote server determines a response to the request using the stored charge status information. The remote server provides the response (i.e., response information) to the mobile device and the mobile device presents the response to the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the present subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An embodiment is now described with reference to the figures where like reference numbers indicate identical or functionally similar elements. In the figures, a letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A," and/or "110B" in the figures). Also in the figures, the left most digits of each reference number correspond to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

The embodiments also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings of the embodiments, and any references below to specific languages are provided for enablement and best mode of the embodiments.

In addition, the language used in the specification has been principally selected for readability and instructional purposes, and may not have been selected to delineate or circumscribe the inventive subject matter. Accordingly, the embodiments are intended to be illustrative, but not limiting, of the scope of the embodiments, which is set forth in the claims.

Figure 1:
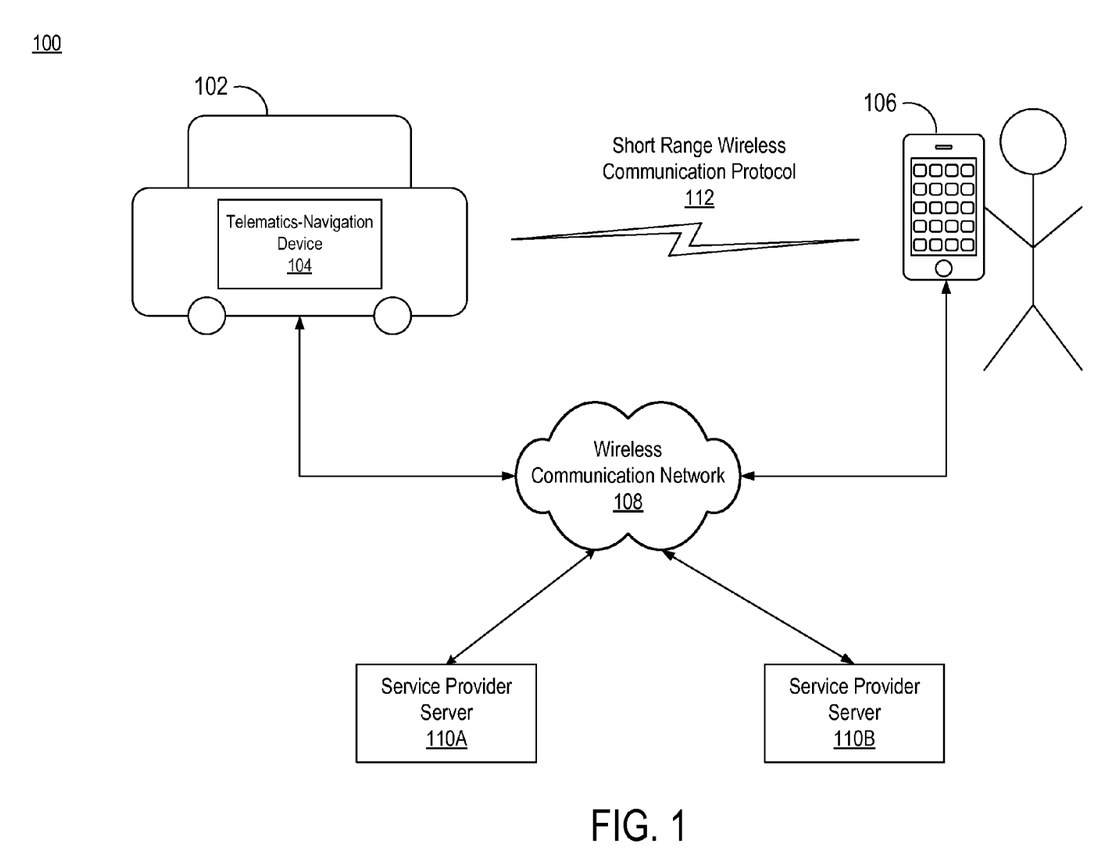
FIG. 1 is a high-level block diagram of a vehicle communication environment according to one embodiment.

FIG. 1 is a high-level block diagram of a vehicle communication environment 100 according to one embodiment. FIG. 1 illustrates an electric vehicle 102, a mobile device 106, and service provider servers 110 connected by a wireless communication network 108.

The electric vehicle 102 represents a vehicle that contains one or more electric engines for propulsion of the vehicle 102. The electric engines are powered by rechargeable batteries on-board the vehicle 102. The on-board batteries are charged when the vehicle 102 is connected to an outside power source. For example, the batteries may be charged by connecting the vehicle 102 to a charging station that draws power from a power grid. The on-board batteries may also be charged using regenerative braking. In one embodiment, the electric vehicle 102 is purely electric in that it only has an electric engine. In another embodiment, the electric vehicle 102 has both an electric engine and internal combustion engine.

The electric vehicle 102 includes a telematics-navigation device 104. The telematics-navigation device 104 represents a device that exchanges information with entities coupled to the wireless communication network 108 and with entities that are within range of a short range wireless communication protocol 112. Specifically, the telematics-navigation device 104 provides vehicle charge status information to the mobile device 106. Charge status information is information that is related to the charge of the electric vehicle's on-board rechargeable batteries. In one embodiment, charge status information includes one or more of the following: the state of charge of the vehicle 102, the driving range of the vehicle 102, an indication as to whether vehicle 102 is being charged, the time that the charging started, the charging rate, and the voltage, current or power output of the charging station. As used herein, the term "state of charge" refers to the amount of charge in the electric vehicle's batteries.

When the telematics-navigation device 104 detects a triggering event that indicates that the electric vehicle 102 has been stopped, the telematics-navigation device 104 transmits charge status information to the mobile device 106 via the short range wireless communication protocol 112. The short range wireless communication protocol 112 is a protocol that uses short radio wavelengths to exchange data over short distances. Therefore, the communication range of the protocol 112 is limited. In one embodiment, the short range wireless communication protocol 112 is Bluetooth®. Typically the charge status information is transmitted within a short time of detecting the triggering event. The triggering may be one or more of the following: the vehicle's engine being turned off, the vehicle 102 being put in park mode (a mode where the vehicle 102 is restricted from moving in any direction), the driver side door being opened after the vehicle 102 has been stopped, and the driver unbuckling his or her seatbelt. The charge status information is sent as a backup so that if later on the mobile device 106 is not able to communicate with the electric vehicle 102, the charge status information can be used to determine the current state of charge of the vehicle 102.

The mobile device 106 represents a portable device that is carried by the driver of the electric vehicle 102 when in the vehicle 102 and when the driver is away from the vehicle 102. The mobile device 106 is configured to communicate via the wireless communication network 108 and the short range wireless communication protocol 112. The mobile device 106 may be, for example, a cell phone, a personal digital assistant (PDA), or a portable computer.

The mobile device 106 receives via the short range protocol 112, the charge status information sent by the electric vehicle 102 in response to a triggering event that indicates that the vehicle 102 has been stopped. The mobile device 106 stores the charge status information. If the driver of the vehicle 102 requests from the mobile device 106 information that involves the current state of charge of the vehicle 102, the mobile device 106 attempts to communicate with the electric vehicle 102 via the wireless communication network 108 and the short range wireless communication protocol 112. If the mobile device 106 is not able to communicate with the vehicle 102, the mobile device 106 determines the current state of charge based on the stored charge status information. The mobile device 106 responds to the driver's request using the determined current state of charge.

A benefit of the electric vehicle 102 providing the charge status information to the mobile device 106 in response to the triggering event is that the mobile device 106 will receive the charge status information, even if the electric vehicle 102 and the mobile device 106 are not able to communicate via the wireless communication network 108. Communication via the short range protocol 112 is possible as long as the mobile device 106 is within the limited range of the protocol 112. Since the information is sent in response to the triggering event, the mobile device 106 will likely be within the range of the protocol 112 and will receive the information.

As an illustrative example of the communication between the electric vehicle 102 and the mobile device 106, assume that the vehicle 102 is parked in a parking garage where there is no cell phone reception and where wireless Internet is not available. Further, assume that 17 seconds after the vehicle 102 is turned off, the driver connects the vehicle 102 to a charging station and starts charging the vehicle 102. The vehicle 102 is configured to send charging information 20 seconds after the vehicle 102 is turned off. Therefore, at the 20 second mark, the vehicle 102 sends to the driver's mobile device 106, via the short range protocol 112, charge status information that includes the state of charge of the vehicle 102 and an indication that the vehicle 102 is being charged. Since the user was by the vehicle 102 at the 17 second mark, it is very likely that driver and the mobile device 106 where within the range of the protocol 112 at the 20 second mark and received the information.

An hour later, the driver is out of range of the short range protocol 112 and the driver requests from the mobile device 106 the current state of charge of the vehicle 102. The mobile device 106 attempts to communicate with the vehicle 102 to obtain the vehicle's current state of charge, but is not able to communicate. Since the mobile device 106 is not able to communicate with the vehicle 102, the mobile device 106 determines the current state of charge on its own. The mobile device 106 estimates the amount of charge the vehicle 102 received in the past hour. The mobile device 106 determines the current state of charge of the vehicle 102 by increasing the state of charge received an hour ago by the estimated amount of charge. The determined state of charge is presented to the driver.

Returning to FIG. 1, the service provider servers 110A and 110B represent entities that perform services for the electric vehicle 102 and/or the mobile device 106. In one embodiment, the service provider servers 110 provide information to electric vehicle 102 and the mobile device 106 to allow them to perform certain functions. For example, the service provider servers 110 may provide the vehicle 102 and the mobile device 106 with traffic information, weather information, road condition information, map information, location information, and driving directions. It should be understood that even though only two service provider servers 110 are shown in FIG. 1, any number of service provider servers 110 can be connected to the wireless communication network 108.

The wireless communication network 108 represents a communication pathway between the electric vehicle 102, the mobile device 106, and the service provider servers 110. In one embodiment, the wireless communication network 108 is a cellular network comprised of multiple base stations, controllers, and a core network that typically includes multiple switching entities and gateways. In one embodiment, the wireless communication network 108 is a wireless local area network (WLAN) that provides wireless communication over a limited area. In one embodiment, the WLAN includes an access point that connects the WLAN to the Internet.

Figure 2:
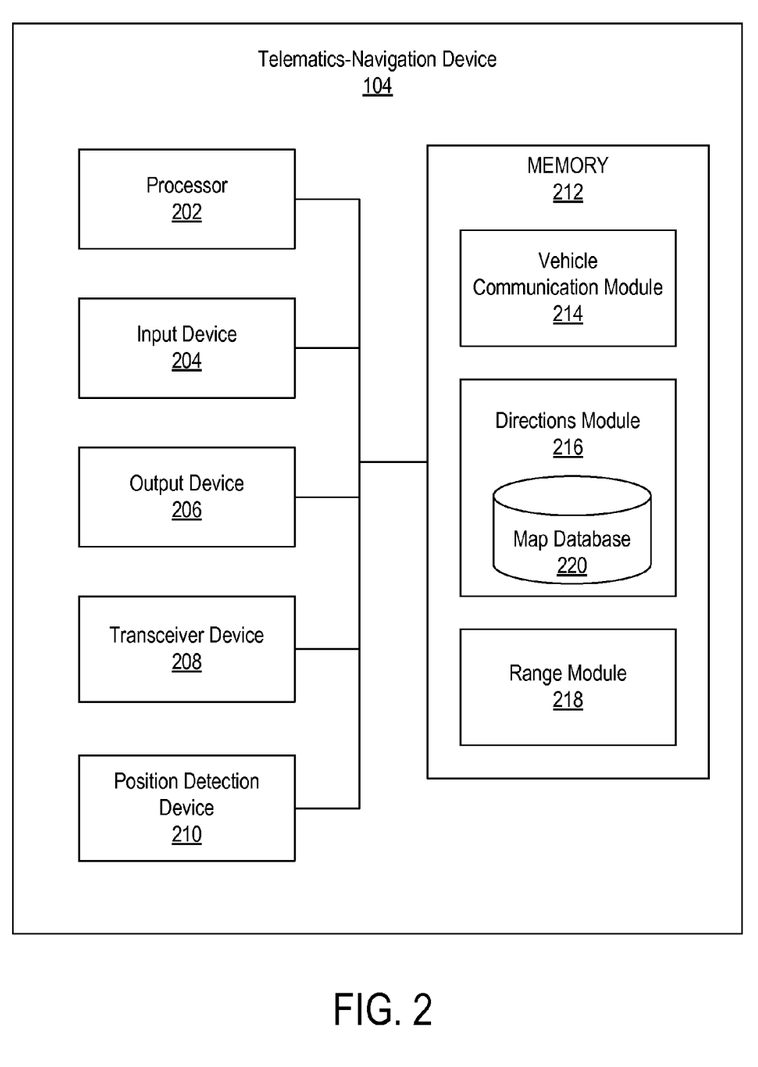
FIG. 2 is a high-level block diagram illustrating a detailed view of a telematics-navigation device according to one embodiment.

FIG. 2 is a high-level block diagram illustrating a detailed view of the telematics-navigation device 104 according to one embodiment. The telematics-navigation device 104 includes a processor 202, an input device 204, an output device 206, a transceiver device 208, a position detection device 210, and a memory 212.

The processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processor 202 comprises an arithmetic logic unit, a microprocessor, a general purpose computer, or some other information appliance equipped to transmit, receive and process electronic data signals from the memory 212, the input device 204, the output device 206, the transceiver device 208, or the position detection device 210.

The input device 204 is any device configured to provide user input to the telematics-navigation device 104 such as, a cursor controller or a keyboard. In one embodiment, the input device 204 can include an alphanumeric input device, such as a QWERTY keyboard, a key pad or representations of such created on a touch screen, adapted to communicate information and/or command selections to processor 202 or memory 212. In another embodiment, the input device 204 is a user input device equipped to communicate positional data as well as command selections to processor 202 such as a joystick, a mouse, a trackball, a stylus, a pen, a touch screen, cursor direction keys or other mechanisms to cause movement adjustment of an image.

The output device 206 represents any device equipped to display electronic images and data as described herein. Output device 206 may be, for example, an organic light emitting diode display (OLED), liquid crystal display (LCD), cathode ray tube (CRT) display, or any other similarly equipped display device, screen or monitor. In one embodiment, output device 206 is equipped with a touch screen in which a touch-sensitive, transparent panel covers the screen of output device 206. In one embodiment, the output device 206 is equipped with a speaker that outputs audio as described herein.

The transceiver device 208 represents a device that allows the telematics-navigation device 104 to communicate with entities via the wireless communication network 108 and the short range wireless communication protocol 112. The transceiver device 208 is used by the telematics-navigation device 104 to communicate with the mobile device 106 and the service provider servers 110. Although a single transceiver device 208 is shown, it should be understood that the telematics-navigation device 104 may include multiple transceiver devices. For example, one transceiver device may be configured to communicate via the wireless communication network 108 and another transceiver device may be configured to communicate via that short range protocol 112. In one embodiment, the transceiver device 208 is for one or more of the following communications: infrared communication, IEEE 802.11a/b/g/n/p communication, 3 G communication, 3GPP Long Term Evolution (LTE), IEEE 802.16 (or WiMax) communication, or radio frequency communication.

In one embodiment, the short range wireless communication protocol 112 is Bluetooth® and the transceiver device 208 is used for Bluetooth communication. The communication range of the transceiver device 208 via Bluetooth is limited. Typically the communication range via Bluetooth is between 1 meter and 100 meters depending on the transceiver device 208. The transceiver device 208 only communicates via Bluetooth with devices with which it has established a connection. A connection with a device will last as long as the device is within range or until one of the devices terminates the connection.

Typically, the first time a connection is being established between two devices, the devices must be paired. The pairing process is started by a first device making its Bluetooth link visible to the second device. The second device identifies the first device and sends a connection request to the first device. If the request is accepted by the first device, a link key is created for their connection and stored by both devices. Once the link key has been stored by both devices, the pairing process is complete and data can be exchanged via Bluetooth. Two devices that have been paired can automatically establish a connection with each other when in range of each other. Here, the telematics-navigation device 104 is paired with the mobile device 106 of the electric vehicle's driver. If multiple drivers use the electric vehicle 102, the telematics-navigation device 104 may be paired with each of the driver's mobile device.

The position detection device 210 represents a device that communicates with a plurality of positioning satellites (e.g., GPS satellites) to determine the geographical location of the electric vehicle 102. In one embodiment, to determine the location of the vehicle 102, the position detection device 210 searches for and collects GPS information or signals from four or more GPS satellites that are in view of the position detection device 210. Using the time interval between the broadcast time and reception time of each signal, the position detection device 210 calculates the distance between the vehicle 102 and each of the four or more GPS satellites. These distance measurements, along with the position and time information received in the signals, allow the position detection device 210 to calculate the geographical location of the vehicle 102.

The memory 212 stores instructions and/or data that may be executed by processor 202. The instructions and/or data may comprise code for performing any and/or all of the techniques described herein. Memory 212 may be a dynamic random access memory (DRAM) device, a static random access memory (SRAM) device, Flash RAM (non-volatile storage), combinations of the above, or some other memory device known in the art. The memory 212 comprises a vehicle communication module 214, a directions module 216, and a range module 218. The modules are adapted to communicate with the processor 202, the input device 204, the output device 206, the transceiver device 208, and/or the position detection device 210.

The vehicle communication module 214 communicates with the mobile device 106 via the transceiver device 208. In one embodiment, the vehicle communication module 214 monitors for a triggering event that indicates that vehicle 102 has been stopped (e.g., engine being turned off or vehicle 102 put in park mode). In response to detecting the event, the vehicle communication module 214 transmits charge status information to the mobile device 106 of the driver via the short range wireless communication protocol 112.

In one embodiment, the charge status information is transmitted to the mobile device 106 at a set time (e.g., 20 seconds) after the triggering event is detected. By waiting a set time it allows for a determination as to whether charging of the vehicle 102 has started since it takes time for the driver to connect the vehicle 102 to a charging station/outside power source. In another embodiment, in response to the triggering event, the vehicle communication module 214 periodically transmits charge status information to the mobile device 106 via the short range protocol 112 until the mobile device 106 is no longer in range. For example, the vehicle communication module 214 may send charge status information to the mobile device 106 immediately after the triggering event is detected and updated charge status information is transmitted every 15 seconds until the mobile device 106 is out of range.

In another embodiment, the vehicle communication module 214 transmits charge status information when the triggering event is detected. If there is any change in the charge status information, the communication module 214 transmits the updated charge status information to the mobile device 106 as long as it is still in range. For example, immediately after the triggering event is detected, the communication module 214 may transmit the state of charge of the vehicle 102 and an indication that the vehicle 102 is not being charged. If charging of the vehicle 102 is started, the communication module 214 transmits updated information indicating that the vehicle 102 is being charged.

In one embodiment, the transmitted charge status information always includes at least the state of charge and an indication of whether the vehicle is being charged. In one embodiment, along with charge status information other vehicle information may be transmitted such as the current location of the vehicle 102, an indication as to whether the vehicle 102 is able to communicate via the network 108, the location of nearby charging stations, diagnostic information of the vehicle 102 (e.g., low tire pressure, low oil), whether any doors are unlocked, and whether any windows are open. In one embodiment, the mobile device 106 uses the other information to present warnings to the driver. For example, if information is transmitted to the mobile device 106 indicating that the vehicle 102 has low tire pressure, the mobile device 106 can notify the driver that air needs to be added to the wheels.

The directions module 216 provides a user of the electric vehicle 102 with driving directions to a destination. When a request is received from a user for directions to a destination, the directions module 216 obtains from the position detection module 210 the current geographic location of the vehicle 102. Based on the current location and the destination, the directions module 216 retrieves a vector map from a map database 220. The map database 220 includes multiple vector maps. In one embodiment, the vector maps indentify the locations of charging stations and other establishments (e.g., restaurants, stores, schools, hospitals, and banks).

The directions module 216 locates the current location and the destination in the map. The directions module 216 identifies multiple routes from the current location to the destination. In one embodiment, the directions module 216 selects one of the routes based on user criteria, such as the fastest route, the shortest route, the least congested route, the most energy efficient route, street route, and highway route. In one embodiment, the directions module 216 uses information (e.g., traffic and weather information) from one or more service provider servers 110 to select a route. In another embodiment, the directions module 216 presents the identified routes to the user and allows the user to select a route. The directions module 216 provides directions through the output device 206 on how to get to the destination via the selected route.

The range module 218 determines the driving range of the electric vehicle 102. What is meant by the range of the vehicle 102 is the distance that the vehicle 102 can travel before it no longer has energy to travel. In one embodiment, the range module 218 receives requests from users (e.g., driver or passenger) for the driving range of the electric vehicle 102. When the range module 218 receives such a request, the range module 218 identifies the current state of charge of the vehicle 102. The range module 218 uses the identified state of charge to calculate the range of the vehicle 102. In one embodiment, the range module 218 calculates the range using a formula that is dependent on the state of charge. In one embodiment, other information in addition to the state of charge may be used to calculate the state of charge such as the weight of the vehicle 102, the age of the batteries, terrain information about the route currently being traveled (e.g., whether traveling uphill), geographic location information, weather information (e.g., the wind speed and whether the vehicle 102 is traveling against the wind), and traffic conditions (e.g., amount of congestion on the route). The calculated driving range is presented to the requesting user.

In one embodiment, the range module 218 receives requests for a determination as to whether the vehicle 102 has sufficient charge to reach a destination. When such a request is received, the range module 218 has the directions module 216 identify a route from the current location of the vehicle 102 to the destination. The range module 218 determines the distance between the current location and the destination on the identified route. The range module 218 determines whether the vehicle 102 has sufficient energy to reach the destination based at least on the current state of charge of the vehicle 102 and the determined distance. In one embodiment, other information such as that described above may be used in addition to the current state of charge and the distance. An indication is given to the requesting user as to whether the vehicle 102 can reach the destination.

In one embodiment, if a determination is made that the vehicle 102 cannot reach the destination, the range module 218 requests from the directions module 216 that it identify nearby charging stations. The identified charging stations are presented to the user. If the user selects to travel to a charging station, the directions module 216 provides directions to the selected charging station.

Figure 3:
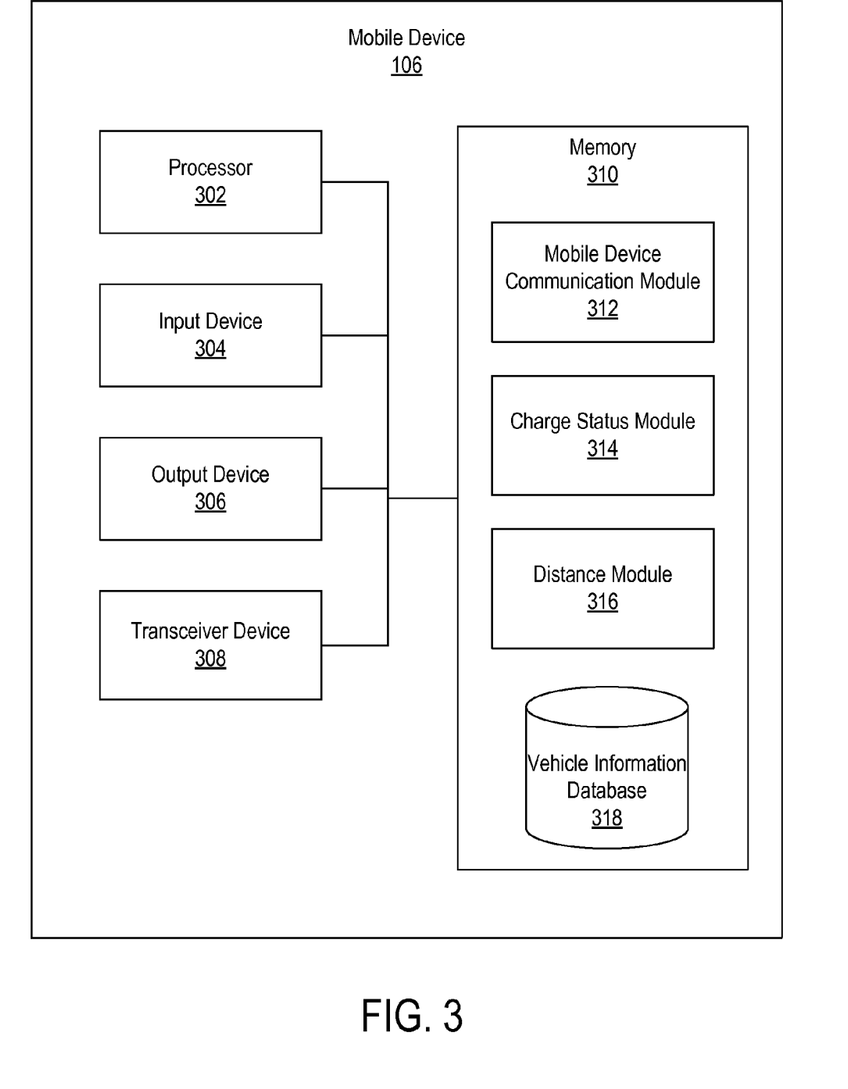
FIG. 3 is a high-level block diagram illustrating a detailed view of a mobile device according to one embodiment.

FIG. 3 is a high-level block diagram illustrating a detailed view of the mobile device 106 according to one embodiment. The mobile device 106 includes a processor 302, an input device 304, an output device 306, a transceiver device 308, and a memory 310.

The processor 302, input device 304, output device 306 and transceiver device 308 of the mobile device 106 have similar functionality to the processor 202, input device 204, output device 304 and transceiver device 304 of the telematics-navigation device 104. Therefore, for purposes of brevity a functional description of these devices is omitted.

Additionally, the memory 310 of the mobile device 106 has similar functionality to the memory 210 of the telematics-navigation device 104. However, the memory 310 of the mobile device 106 includes different modules than those of the telematics-navigation device 104. The memory 310 of the mobile device 106 includes a mobile device communication module 312, a charge status module 314, a distance module 316 and a vehicle information database 318. The modules are adapted to communicate with the processor 302, input device 304, output device 306 and transceiver device 308.

The mobile device communication module 312 communicates with the telematics-navigation device 104 of the vehicle 102 via the transceiver device 308. In one embodiment, the vehicle communication module 214 receives vehicle information from the telematics-navigation device 104 via the short-range wireless communication protocol 112 in response to a triggering event at the vehicle 102 that indicates that the vehicle 102 has been stopped. The vehicle information received includes at least charge status information. The mobile device communication module 312 stores the vehicle information in the vehicle information database 318. Although here the vehicle information database 318 is described as being part of the mobile device 106, in other embodiments the vehicle information database 318 may be remote from the mobile device 106. For example, the vehicle information database 318 may be part of a service provider server 110.

The charge status module 314 responds to requests from the user of the device 106 (i.e., the driver) involving the current state of charge of the electric vehicle 102. In one embodiment, the requests are one or more of the following: a request for the current state of charge of the vehicle 102, a request for the range of the vehicle 102, and a request for a determination as to whether the vehicle 102 can reach a destination. When a request involving the state of charge is received, the charge status module 314 attempts to communicate with the vehicle 102 via the wireless communication network 108 and the short range wireless communication protocol 112.

In one embodiment, if the charge status module 314 is able to communicate with the vehicle 102, the charge status module 314 requests from the vehicle 102 that it satisfy the request received from the user and provide a response to present to the user. For example, if the request is for the current state of charge of the vehicle 102, the charge status module 314 receives the current state of charge from the vehicle 102 and presents it to the user. As another example, if the request is for a determination as to whether the vehicle 102 can reach a destination, the charge status module 314 forwards the request to vehicle 102 and receives from the vehicle 102 an indication as to whether the vehicle 102 can reach the destination. The charge status module 314 notifies the user of whether the vehicle 102 can reach the destination.

In another embodiment, if the charge status module 314 is able to communicate with the vehicle 102, the charge status module 314 requests and receives from the vehicle 102 the current state of charge. The charge status module 314 presents to the user the current state of charge received from the vehicle 102, if the user requested the current state of charge. If the user requested the current range of the vehicle 102 or a determination as to whether the vehicle 102 can reach a destination, the charge status module 314 provides the current state of charge received from the vehicle 102 to the distance module 316 and has it respond to the request.

If the charge status module 314 is not able to communicate with the vehicle 102, the charge status module 314 retrieves from the vehicle information database 318 the latest charge status information received from the vehicle 102 via the short range protocol 112. The charge status module 314 uses the retrieved charge status information to determine the current state of charge of the vehicle 102. The current state of charge determined by the charge status module 314 is an estimate of the vehicle's current state of charge. Based on the retrieved charge status information an estimation can be made as to how much vehicle's charge has dropped or increased since receiving the charge status information. The vehicle's charge will have increased if the vehicle has been charging. On the other hand, the vehicle's charge will have decreased if it has not been charging due to parasitic loss. Parasitic loss is battery charge loss due general power requirements of the vehicle 102 when the vehicle 102 is off, such as charge used to power the key less entry system (i.e., being ready to receive keyless entry remote signal) and charge used by the vehicle's alarm system.

In one embodiment, charge status information used by the charge status module 314 to determine the current state of charge includes at least the state of charge of the vehicle 102 at the time when the retrieved information was sent to the mobile device 106 and information as to whether the vehicle 102 was being charged at the time. In this embodiment, to determine the state of charge, the charge status module 314 identifies the last state of charge received from the vehicle 102 via the protocol 112 and determines whether the vehicle 102 was being charged when the information was transmitted by the vehicle 102. If the vehicle 102 was being charged, the charge status module 314 estimates the amount of charge that the vehicle 102 has received since the charge status information was transmitted by the vehicle 102. The charge status module 314 determines the current state of charge of the vehicle 102 based at least on the state of charge received from the vehicle 102 and the estimated amount of charge increase.

On the other hand, if the vehicle 102 was not being charged when the charge status information was transmitted, the charge status module 314 estimates the amount of parasitic loss of the vehicle 102 since the charge status information was transmitted by the vehicle 102. The charge status module 314 determines the current state of charge of the vehicle 102 based at least on the state of charge received from the vehicle 102 and the estimated parasitic loss.

If the user requested the current state of charge, the state of charge determined by the charge status module 314 is presented to the user. If the user requested the current range of the vehicle 102 or a determination as to whether the vehicle 102 can reach a destination, the state of charge determined by the charge status module 314 is provided to the distance module 316 and the charge status module 314 requests that it respond to the request using the determined state of charge.

The distance module 316 responds to requests using state of charge information provided by the charge station module 314. The functionality of the distance module 316 is similar to that of the range module 218 of the telematics-navigation device 104, except that the distance module 316 uses a state of charge provided by the charge station module 314 to respond to a request.

If a user requested the current range of the vehicle 102, the distance module 316 uses at least the state of charge provided by the charge station module 314 to calculate the current range of the vehicle 102. The calculated range is presented to the user. If a user requested a determination as to whether the vehicle 102 can reach a destination, the distance module 316 determines the distance between the current location of the vehicle 102 and the destination. In one embodiment, the distance module 316 obtains the distance information from a service provider server 110. The distance module 316 determines whether the vehicle 102 has sufficient energy to reach the destination based at least on the determined distance and the state of charge provided by the charge station module 314. The user is notified of whether the vehicle 102 can reach the destination with its current state of charge.

Some of the functionality described herein with regards to the mobile device 106 may be performed by one or more service provider servers 110. For example, in one embodiment, if the charge status module 314 receives a request involving the current state of charge of the electric vehicle 102 and the charge status module 314 is not able to communicate with the vehicle 102, the charge status module 314 may forward the request to a service provider server 110 along with the latest charge status information received from the vehicle 102 via the short range protocol 112. The service provider server 110 provides the charge status module 314 with a response to present to the requesting user (e.g., current state of charge of the vehicle 102, current range of vehicle 102, or an indication of whether the vehicle 102 can reach a destination).

As another example, the mobile device communication module 312 may store charge status information received from the vehicle 102 via the short-range protocol 112 at a service provider server 110. When the charge status module 314 receives a request from a user involving the current state of charge of the electric vehicle 102, the charge status module 314 forwards the request to the service provider server 110. If the service provider server 110 is not able to communicate with the vehicle 102 via the mobile device 106 or on its own, the service provider server 110 responds to the request using the stored charge status information. The service provider server 110 provides the mobile device 106 with a response (i.e., response information) to present to the requesting user.

It should be apparent to one skilled in the art that the telematics-navigation device 104 and the mobile device 106 may include more or less components than those shown in FIGS. 2 and 3 without departing from the spirit and scope of the embodiments. For example, the telematics-navigation device 104 may include additional memory, such as, for example, a first or second level cache, or one or more application specific integrated circuits (ASICs). Similarly, telematics-navigation device 104 may include additional input or output devices. In some embodiments one or more of the components can be positioned in close proximity to each other while in other embodiments these components can be positioned in different locations. For example the units in memory 212 of the telematics-navigation device 104 can be programs capable of being executed by one or more processors located in other devices in the electric vehicle 102.

Figure 4:
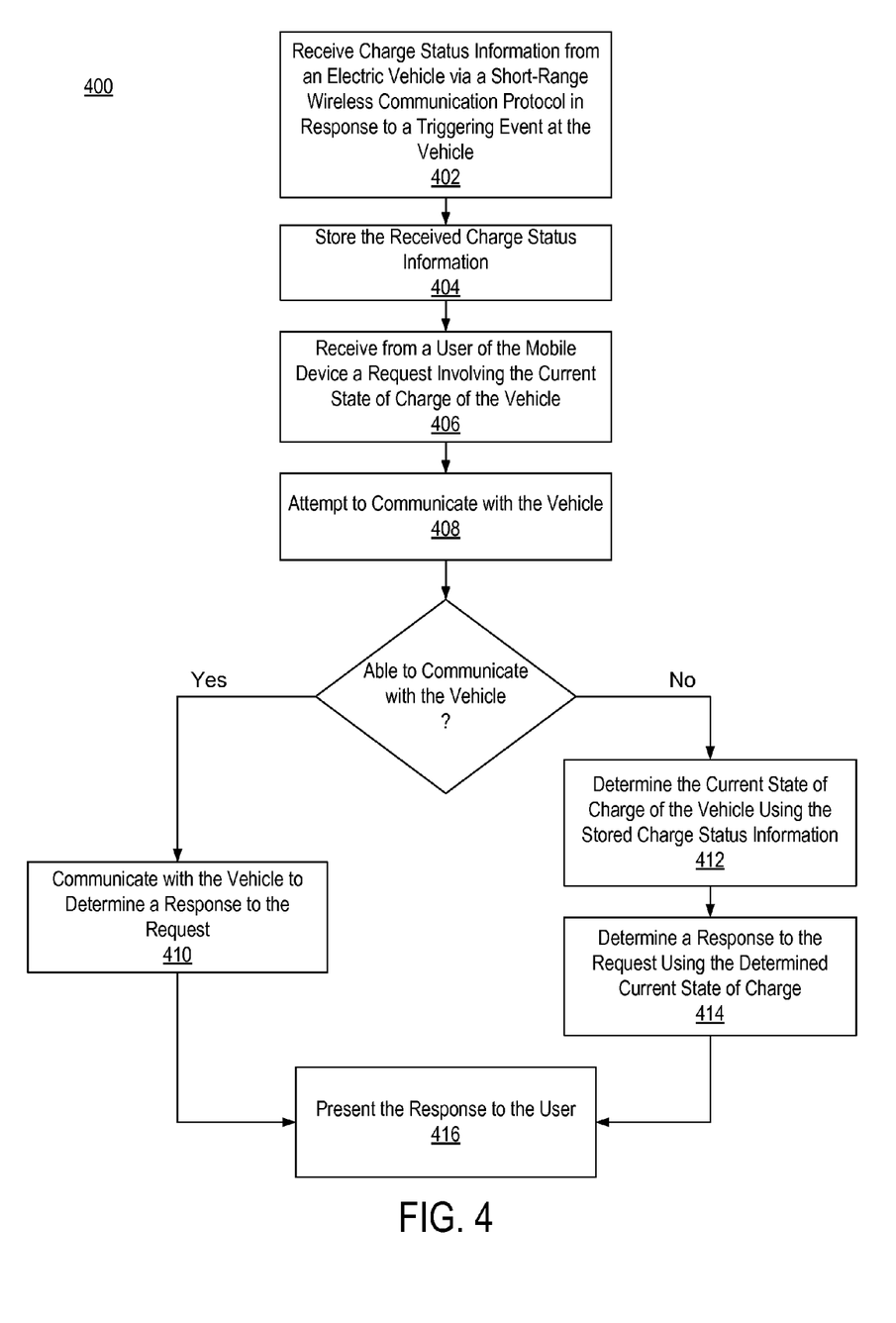
FIG. 4 is a flow chart of a method for responding to a request involving a state of charge of an electric vehicle according to one embodiment.

FIG. 4 is a flow chart 400 of a method for responding to a request involving a state of charge of an electric vehicle 102 according to one embodiment. In one embodiment, the steps of the method are implemented by the processor 302 of the mobile device 106 executing instructions that cause the desired actions. Those of skill in the art will recognize that one or more of the method steps may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 4 in different orders. Moreover, other embodiments can include different and/or additional steps than the ones described here.

The mobile device 106 receives 402 charge status information from the electric vehicle 102 via the short-range wireless communication protocol 112 in response to a triggering event at the vehicle 102. The mobile device 106 stores 404 the received charge status information. At some point the mobile device 106 receives 406 from the user of the device 106, a request involving the current state of charge of the vehicle 102. The request may be, for example, a request for the current state of charge of the vehicle 102, a request for the current driving range of the vehicle 102, or a request for a determination as to whether the vehicle 102 can reach a destination with its current state of charge.

The mobile device 106 attempts 408 to communicate with the vehicle 102. If the mobile device 106 is able to communicate with the vehicle 102, the mobile device 106 communicates 410 with the vehicle 102 to determine a response to the request. However, if the mobile device 106 is unable to communicate with the vehicle 102, the mobile device 106 determines 412 the current state of charge of the vehicle 102 using the stored charge status information. The mobile device 106 uses the determined current state of charge to determine 414 a response to the request. The mobile device 106 presents 416 the response to the user.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments present disclosure without departing from the spirit and scope of the disclosure.

The invention claimed is:

1. A computer-implemented method for remotely responding to a request for information regarding an electric vehicle, the method comprising:
   storing charge status information of the electric vehicle, the charge status information received from the electric vehicle via a short range wireless communication protocol in response to a triggering event at the vehicle indicating stoppage of the vehicle;
   receiving from a user a request involving a current state of charge of the electric vehicle; and
   responsive to being unable to communicate with the electric vehicle, responding to the request using the stored charge status information.

2. The method of claim 1, wherein the short range wireless communication protocol is Bluetooth®.

3. The method of claim 1, wherein the triggering event is at least one of the following: an engine of the vehicle being turned off, the vehicle being put in park mode, a driver side door being opened after the vehicle has been stopped, and the driver unbuckling his or her seatbelt.

4. The method of claim 1, wherein charge status information is transmitted from the electric vehicle a set time after the triggering event.

5. The method of claim 1, wherein charge status information is transmitted from the electric vehicle periodically in response to the triggering event.

6. The method of claim 1, wherein charge status information is transmitted from the electric vehicle in response to the triggering event and updated charge status information is transmitted from the electric vehicle in response to a change in the charge status information.

7. The method of claim 1, further comprising:
   responsive to being unable to communicate with the electric vehicle, determining a current state of charge of the electric vehicle based on the stored charge status information; and
   responding to the request using the determined current state of charge.

8. The method of claim 1, wherein the charge status information includes a state of charge of the electric vehicle and an indication of whether the electric vehicle is being charged.

9. The method of claim 8, wherein responding to the request comprises:
   responsive to the charge status information indicating that the vehicle is being charged, estimating an amount of charge increase since the vehicle transmitted the charge status information;
   determining a current state of charge of the electric vehicle based on the estimated charge increase and the state of charge included in the charge status information; and
   responding to the request using the determined current state of charge.

10. The method of claim 8, wherein responding to the request comprises:
    responsive to the charge status information indicating that the vehicle is not being charged, estimating an amount of charge decrease since the vehicle transmitted the charge status information;
    determining a current state of charge of the electric vehicle based on the estimated charge decrease and the state of charge included in the charge status information; and
    responding to the request using the determined current state of charge.

11. The method of claim 1, wherein the request is for a current state of charge of the electric vehicle and responding to the request comprises:
    determining the current state of charge of the electric vehicle based on the stored charge status information; and
    presenting the determined current state of charge to the user.

12. The method of claim 1, wherein the request is for a current driving range of the electric vehicle and responding to the request comprises:
    determining a current state of charge of the electric vehicle based on the stored charge status information;
    calculating the current driving range of the electric vehicle based on the determined current state of charge; and
    presenting the current driving range to the user.

13. The method of claim 1, wherein the request is for a determination as to whether the electric vehicle can reach a destination with its current state of charge and responding to the request comprises:
    determining a current state of charge of the electric vehicle based on the stored charge status information;
    determining a distance between a current location of the vehicle and the destination;
    determining whether the vehicle can reach the destination based on the determined current state of charge and the determined distance; and
    notifying the user as to whether the vehicle can reach the destination.

14. The method of claim 1, wherein a mobile device performs the storing, receiving, and responding.

15. A computer program product having a non-transitory computer-readable storage medium having computer-executable code for remotely responding to a request for information regarding an electric vehicle, the computer-executable code comprising:
  a mobile device communication module configured to store charge status information of the electric vehicle, the charge status information received from the electric vehicle via a short range wireless communication protocol in response to a triggering event at the vehicle indicating stoppage of the vehicle; and
  a charge status module configured to:
    receive from a user a request involving a current state of charge of the electric vehicle; and
    respond to the request using the stored charge status information responsive to not being able to communicate with the electric vehicle.

16. The computer program product of claim 15, wherein the short range wireless communication protocol is Bluetooth®.

17. The computer program product of claim 15, wherein the charge status module is further configured to:
  determine a current state of charge of the electric vehicle based on the stored charge status information responsive to not being able to communicate with the electric vehicle; and
  respond to the request using the determined current state of charge.

18. The computer program product of claim 15, wherein the charge status information includes a state of charge of the electric vehicle and an indication of whether the electric vehicle is being charged.

19. The computer program product of claim 18, wherein the charge status module is further configured to:
  estimate an amount of charge increase since the vehicle transmitted the charge status information in response to the charge status information indicating that the vehicle is being charged;
  determine a current state of charge of the electric vehicle based on the estimated charge increase and the state of charge included in the charge status information; and
  respond to the request using the determined current state of charge.

20. The computer program product of claim 18, wherein the charge status module is further configured to:
  estimate an amount of charge decrease since the vehicle transmitted the charge status information in response to the charge status information indicating that the vehicle is not being charged;
  determine a current state of charge of the electric vehicle based on the estimated charge decrease and the state of charge included in the charge status information; and
  respond to the request using the determined current state of charge.

21. A mobile computer system for remotely responding to a request for information regarding an electric vehicle, the mobile computer system comprising:
  a computer processor; and
  a computer-readable storage medium storing computer program modules configured to execute on the computer processor, the computer program modules comprising:
    a mobile device communication module configured to store charge status information of the electric vehicle, the charge status information received from the electric vehicle via a short range wireless communication protocol in response to a triggering event at the vehicle indicating stoppage of the vehicle; and
    a charge status module configured to:
      receive from a user a request involving a current state of charge of the electric vehicle; and
      respond to the request using the stored charge status information responsive to not being able to communicate with the electric vehicle.

22. The mobile computer system of claim 21, wherein the short range wireless communication protocol is Bluetooth®.

23. The mobile computer system of claim 21, wherein the triggering event is at least one of the following: an engine of the vehicle being turned off, the vehicle being put in park mode, a driver side door being opened after the vehicle has been stopped, and the driver unbuckling his or her seatbelt.

24. The mobile computer system of claim 21, wherein the charge status module is further configured to:
  determine a current state of charge of the electric vehicle based on the stored charge status information responsive to not being able to communicate with the electric vehicle; and
  respond to the request using the determined current state of charge.

25. The mobile computer system of claim 21, wherein the charge status information includes a state of charge of the electric vehicle and an indication of whether the electric vehicle is being charged.

26. The mobile computer system of claim 25, wherein the charge status module is further configured to:
  estimate an amount of charge increase since the vehicle transmitted the charge status information in response to the charge status information indicating that the vehicle is being charged;
  determine a current state of charge of the electric vehicle based on the estimated charge increase and the state of charge included in the charge status information; and
  respond to the request using the determined current state of charge.

27. The mobile computer system of claim 25, wherein the charge status module is further configured to:
  estimate an amount of charge decrease since the vehicle transmitted the charge status information in response to the charge status information indicating that the vehicle is not being charged;
  determine a current state of charge of the electric vehicle based on the estimated charge decrease and the state of charge included in the charge status information; and
  respond to the request using the determined current state of charge.

28. A computer-implemented method for remotely responding to a request for information regarding an electric vehicle, the method comprising:
  storing charge status information of the electric vehicle received from a mobile device, the charge status information provided to the mobile device via a short range wireless communication protocol in response to a triggering event at the vehicle indicating stoppage of the vehicle;
  receiving a request involving a current state of charge of the electric vehicle; and
  responsive to being unable to communicate with the electric vehicle, responding to the request using the stored charge status information.

29. A computer-implemented method for remotely responding to a request for information regarding an electric vehicle, the method comprising:
  transmitting to a remote server charge status information of the electric vehicle received from the electric vehicle, the charge status information received via a short range wireless communication protocol in response to a triggering event at the vehicle indicating stoppage of the vehicle;

forwarding a request from a user to the remote server, the request involving a current state of charge of the electric vehicle;

presenting a response to the user based on response information received from the remote server, the response information generated by the remote server using the charge status information responsive to the remote server not being able to communicate with the electric vehicle.

* * * * *